(12) United States Patent
Krumbholz

(10) Patent No.: US 7,658,789 B1
(45) Date of Patent: Feb. 9, 2010

(54) OFF GAS EXTRACTION AND CHEMICAL RECOVERY SYSTEM AND RELATED METHODS

(76) Inventor: Carol Diane Krumbholz, 1949 N. Diamond St., Orange, CA (US) 92867

( * ) Notice: Subject to any disclaimer, the term of this patent is extended or adjusted under 35 U.S.C. 154(b) by 257 days.

(21) Appl. No.: 11/960,651

(22) Filed: Dec. 19, 2007

(51) Int. Cl.
B01D 53/02 (2006.01)
F25J 3/00 (2006.01)

(52) U.S. Cl. .................................................... 96/132

(58) Field of Classification Search ............ 95/39, 95/41, 90, 96, 141, 142, 148, 288; 96/111, 96/121, 132, 413; 405/128.1, 128.2, 128.7; 62/600, 617; 210/800
See application file for complete search history.

(56) References Cited

U.S. PATENT DOCUMENTS

| | | | | |
|---|---|---|---|---|
| 4,000,990 A | * | 1/1977 | Bingham | ................... 95/103 |
| 4,715,965 A | * | 12/1987 | Sigerson et al. | ............. 210/511 |
| 4,784,672 A | * | 11/1988 | Sircar | ............................ 95/97 |
| 4,941,894 A | | 7/1990 | Black et al. | |
| 4,982,788 A | * | 1/1991 | Donnelly | ................... 405/131 |
| 5,069,783 A | | 12/1991 | Wang et al. | |
| 5,220,796 A | * | 6/1993 | Kearns | .......................... 62/636 |
| 5,308,457 A | | 5/1994 | Dalla Betta et al. | |
| 5,375,539 A | * | 12/1994 | Rippberger | ................. 110/238 |
| 5,453,259 A | | 9/1995 | D'Souza | |
| 5,496,395 A | * | 3/1996 | Yamazaki | .................... 96/123 |
| 5,531,901 A | * | 7/1996 | Miyabe et al. | ............... 210/668 |
| 5,538,535 A | | 7/1996 | Pinnau et al. | |
| 5,552,051 A | | 9/1996 | Wang et al. | |
| 5,580,461 A | | 12/1996 | Cairns et al. | |
| 5,676,737 A | * | 10/1997 | Whitlock | ....................... 95/90 |
| 5,861,049 A | | 1/1999 | Lokhandwala et al. | |
| 5,904,750 A | * | 5/1999 | Cowles | ....................... 95/109 |
| 6,711,906 B2 | | 3/2004 | Pritchard et al. | |
| 7,377,959 B2 | * | 5/2008 | Kozaki et al. | .................. 95/142 |
| 2002/0162453 A1 | * | 11/2002 | Kato | ............................ 95/143 |
| 2005/0098034 A1 | * | 5/2005 | Gittleman et al. | ............... 95/96 |
| 2005/0121393 A1 | | 6/2005 | Galbraith | |
| 2005/0150379 A1 | | 7/2005 | Masetto et al. | |

FOREIGN PATENT DOCUMENTS

WO WO 2005/081722 A2 9/2005

* cited by examiner

Primary Examiner—Frank M Lawrence
(74) Attorney, Agent, or Firm—Luce, Forward, Hamilton & Scripps; Marlan D. Walker

(57) ABSTRACT

An off gas extraction system provides superior results to other systems for cleaning polluted soil. Off gas is extracted, followed by compression and condensation. Compression and condensation produce an off gas that must be further treated to produce pollutant-free exhaust. A regenerative adsorber cleans the influent gas/air by adsorbing residual chemical vapor and concentrates the removed chemical vapor and reprocesses them. Conventional scrubbers are used on the back end of the system to produce a final exhaust as prescribed by environmental regulation. Methods of accomplishing the same are similarly provided, including unique business methods for conforming extraction plans with current environmental regulations and compliance impact generation based on an evolved knowledge base.

1 Claim, 8 Drawing Sheets

OFF GAS EXTRACTION AND CHEMICAL RECOVERY SYSTEM AND RELATED METHODS

RELATED APPLICATIONS

This application claims the Paris Convention Priority of U.S. Utility application Ser. No. 11/611,773, entitled "OFF GAS EXTRACTION AND CHEMICAL RECOVERY SYSTEM AND RELATED METHODS" filed on 19 Dec. 2006, the contents of which are incorporated by reference herein.

SUMMARY

An off gas extraction system provides superior results to other systems for cleaning polluted soil and recovery of chemicals from soil. Off gas is extracted, followed by a compression and condensation. Compression and condensation produce liquid condensates and an off gas that must be further treated to produce pollutant-free exhaust. A regenerative adsorber concentrates polluted off gasses, which are sent to the front of the system. Conventional scrubbers are used on the back end of the system to produce a final exhaust as prescribed by environmental regulation. Methods of accomplishing the same are similarly provided, including business methods for efficiently remediating polluted soil by optimizing target off gas selection and processing of the same to achieve compliance with changing environmental regulations.

According to a feature of the present disclosure, a system for extracting pollutants from off gas is disclosed comprising, in combination: at least one off gas extraction well, a compressor, a heat exchanger to condense fluid from off gas, a regenerative adsorbing unit having at least one regenerative adsorber, and a specific gravity separator.

According to another feature, a regenerative adsorber is disclosed comprising, in combination: at least one chamber containing activated alumina, where each chamber has at least one inlet and at least one outlet. The activated alumina is charged with a pollutant at high pressure and the pollutant is unloaded from the activated alumina at low pressure.

Moreover, further features of the present disclosure are disclosed including a method of extracting pollutant from soil comprising in combination: extracting an off gas, compressing the off gas, condensing the off gas to form at least one liquefied contaminant, adsorbing any residual pollutants from the compressed condensed off gas with at least one regenerative adsorber to produce a substantially pollutant-free off gas, scrubbing the substantially pollutant-free off gas with activated carbon, and determining compliance with applicable regulatory requirements.

Still more features of the present disclosure are disclosed including a method for optimizing extraction of pollutant from soil comprising, in combination: initiating testing to determine contaminants to be addressed at a remediation site, generating a preliminary plan to optimize recovery of contaminants, cross referencing the preliminary plan to a database of recovery parameters defined by a regulatory authority, executing the plan with an off gas extraction system to recover the contaminants, verifying the nature and quantities of the species of recovered contaminants to form a set of data, and confirming that the data satisfy regulations imposed by a regulatory body.

Finally according to a feature of the present disclosure, there is disclosed a method comprising: determining a remediation site, recovering at least one contaminant from the site, separating recovered contaminants into at least one subset of contaminants, and recycling the separated recovered contaminants for reuse.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
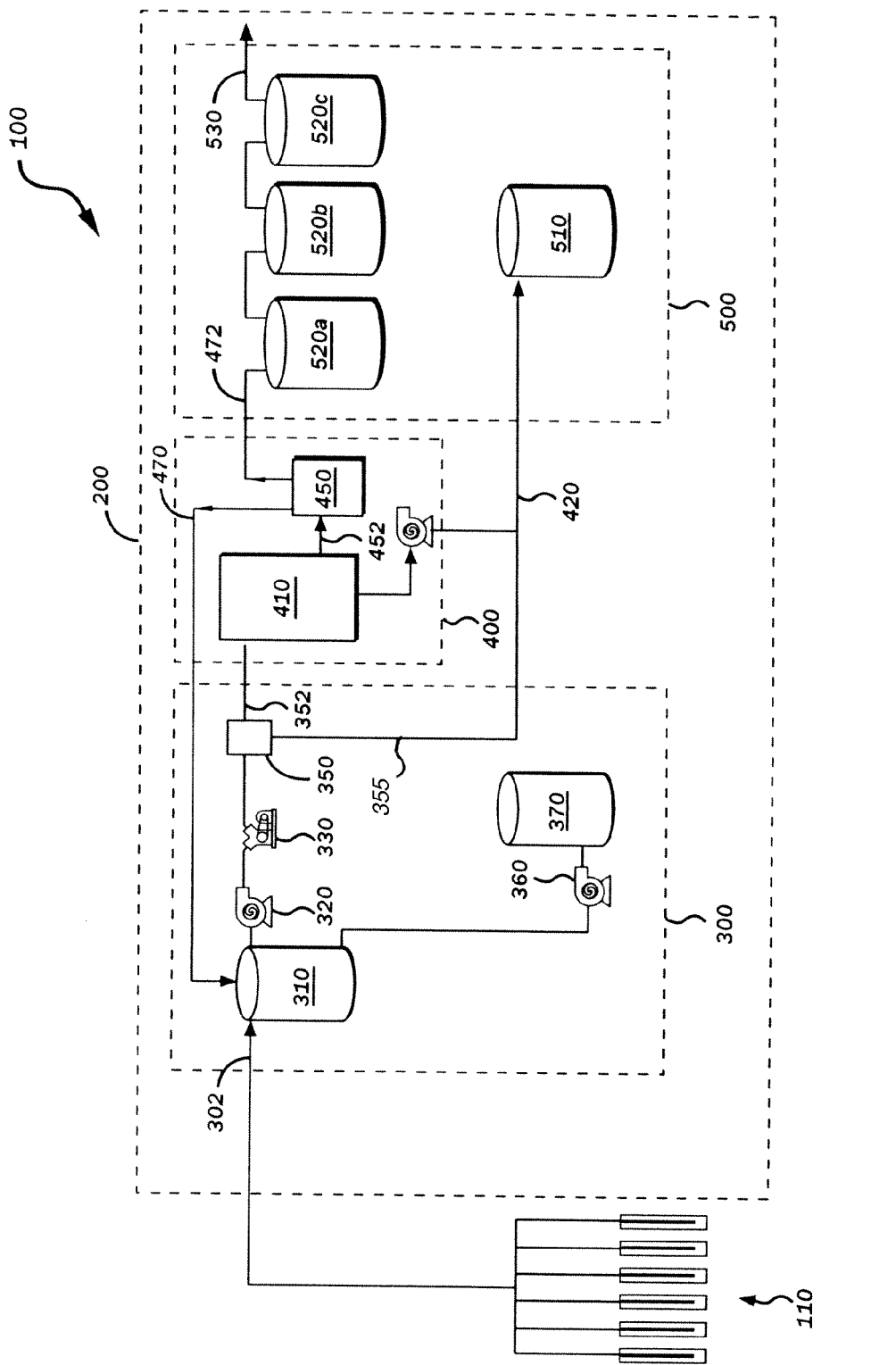
FIG. 1 is a block diagram of an embodiment of an off gas extraction system for removing pollutant from soils.

As used in the present disclosure, the term "off gas" shall be defined as gasses extracted from contaminated sources and includes soil vapors and previously collected soil vapors.

The industrial revolution marked a radical change to many aspects of society. Industrialized nations became increasingly productive and urbanized. Chemical production became centralized. Other industries utilized chemicals in the production process of other goods. Increased pollution was the result. Soil, air, and water carried unprecedented levels of pollutants over the last 200 years.

Nevertheless, during the middle of the $20^{th}$ century, social conscience and government sought to eliminate or reduce pollution where possible. The United States government passed strict environmental laws and set aside funds for cleaning polluted natural resources. Similarly, corporations and companies are taking steps to improve the nature and quality of pollutants and to address polluted natural resources.

Traditionally, pollutants trapped in the soil have been very difficult to address. Contaminated soil provides a uniquely difficult problem in that it cannot be filtered like air or water. Rather, pollutants must be drawn out of the soil. Generally, the process of drawing out the pollutant requires air or water and heat to be used to enable extraction of the pollutant as a vapor or liquid, which must then be quarantined or cleansed. Often, pollutants are removed from the soil by off gas extraction processes.

Soil vapor extraction (SVE), also known as "soil venting" or "vacuum extraction", is an in situ remedial technology that reduces concentrations of volatile pollutants. In this technology, a vacuum is applied to wells neat the source of contamination in the soil. Volatile constituents of the contaminant mass "evaporate" and the vapors are drawn toward and extracted through the extraction wells. Extracted vapor is then cleansed. The increased airflow through the subsurface can also stimulate biodegradation of some contaminants, especially those that are less volatile. Wells may be either vertical or horizontal.

SVE has been successfully applied to many petroleum derived volatile organic compounds (VOCs) as well as semi-volatile organic compounds (SVOCs). However, other chemicals present in the soil have been difficult, if not impossible, to remove using technologies prior to the present disclosure. Indeed, prior technologies are unsuited for remediation of halogenated chemicals, chloromethane, and many other volatile chemicals.

Prior technologies often rely on compression and condensation for removal of VOCs. These systems may also be coupled with scrubbing units for residual removals of contaminated vapor prior to release to the atmosphere. Usually, scrubbing units comprise granular activated carbon (GAC) traps. Once each GAC trap becomes saturated with residual contaminant, they must be replaced and new activated carbon used. Certain regenerative systems treat GAC with steam, which removes contaminants from the carbon. For certain chemicals, such as halogenated compounds, the heat and water from steam results in strong hydrohalic acids. These acids are difficult to handle, involve health and safety risks, cause corrosion, and consequently carry with them increased costs of remediation.

Moreover, other VOCs, such as chloromethane and freon are difficult to remove in compression and condensation steps due to their low condensation points. Thus, to remove these types of chemicals from the gas stream, the condensation process must cool the vapor to extremely low temperatures, which increases costs and makes prior SVE methods for dealing with these types of chemicals less attractive. Moreover, remediation sites may often contain these types of chemicals in combination with other VOCs. When contaminated vapors are not removed in the compression/condensation step, the scrubbing units become the primary SVE component for removing these types of VOCs. The result is more frequent replacement of the scrubbing reagents, as well as undesirable side effects previously discussed and many others.

Moreover, regenerative processes that require heat are potentially dangerous with VOCs that have high vapor pressures. Introducing heat in the presence of oxygen in these situations may lead to fires and explosions. In addition to potential destruction of hardware that may occur due to fires and explosions, the VOCs or dangerous byproducts may also be released generally into the atmosphere. Thus, a system is needed to allow SVE remediation for VOCs that are not suited to traditional VOC methods and systems. The present disclosure addresses this need by providing a novel enhanced SVE system and methods capable of remediation of soil containing difficult to remove VOCs.

Turning now to FIG. 1, there is shown an embodiment of a remediation and chemical recovery system 100. Remediation and chemical recovery system 100 generally comprises a plurality of extraction wells 110 and SVE system 200. SVE system 200 comprises a number of subsystems, according to embodiments, including vacuum and compression module 300, vapor elimination module 400, and contaminant recovery module 500. Vacuum and compression module 300 removes off gas from extraction wells 110, removes liquid constituents recovered in the off gas removal process, and compresses the off gas. Vapor elimination module 400 removes contaminated vapor from the gas, producing a substantially dry gas as an intermediate result. Finally, contaminant elimination module 500 collects chemical vapors and scrubs the substantially dry gas for residual contaminant.

Figure 2:
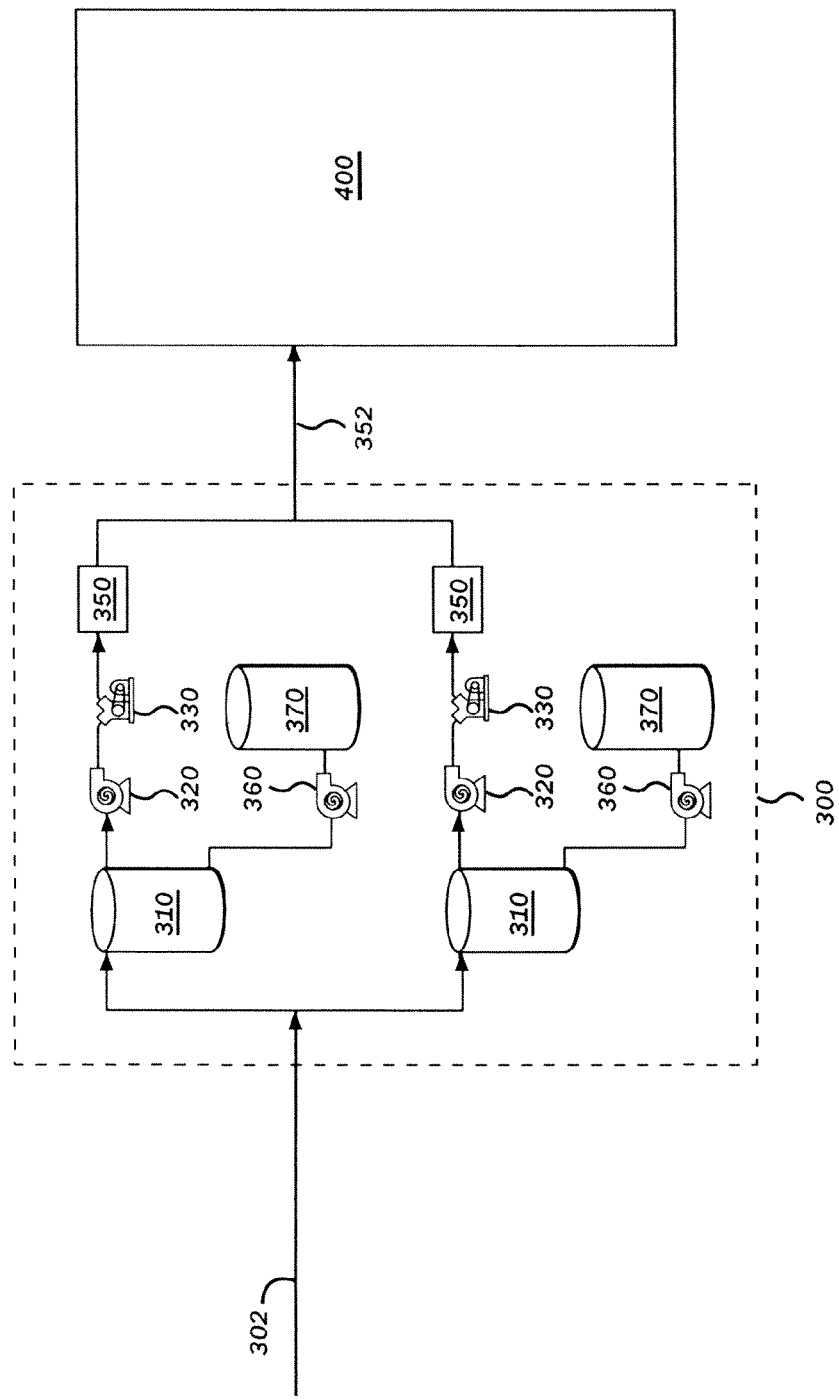
FIG. 2 is a block diagram of an embodiment of a module for preparing an off gas to have pollutant-laden vapor removed.

According to an embodiment of vacuum and compression module 300 in FIG. 2, contaminated vapor is removed from extraction wells 110 and transferred via inlet conduit 302 into vacuum and compression module 300. According to embodiments, water and gas are separated using gas/water separator 310 to prevent liquid from entering compressor 330. According to embodiments, gas/water separator 310 may be, for example, a 60 gallon Manchester vertical tank (Manchester Tank, Franklin, T). Gas/water separator 310 comprises an inlet connected to inlet conduit 302, a gas outlet, and a liquid out.

The gas outlet is connected to inlet blower, for example a Roots type blower (e.g., frame size 36 powered by 116 cfm at 10" Hg, 5-10 horsepower, 3 phase, totally enclosed, fan cooled (TEFC) 240/280 volt electric motor). Blower 320 is used to create a vacuum that pulls vapor from extraction wells 110. Other similar vacuum creation devices may be used depending on the desired gas flow rate, etc. as known and understood by a person of ordinary skill in the art.

As shown in FIG. 1, the liquid inlet connects to transfer pump 360, which pumps liquid from gas/water separator 310 into initial contaminant recovery tank 370. Generally, depending on the well configuration, little water will be extracted from extraction well 110. However, if the water table is high, slurping may occur necessitating gas/water separator 310 to separate the water from the gas. According to this configuration, holes are inserted into pipes at each extraction well site, some above that water table and some below. The vacuum pulls both vapor and water from the well, which is then separated by gas/water separator 310.

Transfer pump 360 removes liquid from gas/water separator 310. Transfer pump 360 may be, for example, a centrifugal, 120/230 volt, ½ horsepower motor pump capable of moving 20 gallons per minute, according to embodiments. Naturally, extraction wells 110 that produce large volumes of water may need transfer pump 360 that is capable of pumping liquid at a more rapid rate. Similarly, extraction wells 110 producing only nominal amounts of water may be fitted with transfer pump 360 that moves fewer gallons per minute. The exact choice of transfer pump 360 will be known and understood by artisans.

Initial contaminant recovery tank 370 may be any tank suitable for the purpose of collecting contaminated liquids. As described below, a specific gravity separator may be disposed between transfer pump 360 and initial contaminant recovery tank 370 to separate each specific contaminant from the other contaminants, according to embodiments.

Turning back to FIG. 2, inlet blower 320 moves gas containing contaminated vapor from gas/water separator 310 to compressor 330. Compressor may be any number of conventional air compressor systems known to artisans, e.g., a Quincy Model Q 5120 reciprocating compressor, 94 scfm at 175 psi, powered by a 25-horsepower TEFC 240/280 volt electric motor. A person of ordinary skill in the art will know and understand the applicable compressors to use based on the relevant parameters in the system. According to embodiments, air compressor 330 will be able to compress gas to at least 175 psi. Compressed gas containing contaminated vapor concentrates the contaminated vapor for later removal in vapor elimination module 400.

After gas is compressed with gas compressor 330, gas is routed to aftercooler 350, which commences a first round of cooling for the compressed gas containing the contaminated vapor. According to embodiments, aftercooler 350 may be comprised of a Arrow model AFC 120-1 air to air cooler system (at 150 psi and 180 scfm). As gas is compressed, temperature of gas increases substantially in compliance with that algorithm defined by or known as the ideal gas law. Aftercooler 350 provides the initial cooling of hot gas prior to full condensation in vapor elimination module 400. As the hot gas cools, initial condensation may occur and an amount of contaminated vapor may condense. The condensate is transferred from aftercooler 350 via aftercooler conduit 355 to initial contaminant recovery tank 510.

Exhaust from vacuum and compression module 300 is directed to vapor elimination module 400 via vapor elimination inlet conduit 352. According to embodiments, vapor elimination module 400 comprises condensation module 410 and regenerative adsorber module 450. Vapor is initially directed to condensation module 410. In condensation module 410, a great majority of contaminated vapor is condensed and caused to be collected by primary contaminant recovery tank 510. In regenerative adsorber module 450, residual contaminated vapor is captured and routed to the front on SVE system 200 and rerouted into vapor elimination module 400; clean air from regenerative adsorber module 450 is exhausted to activated carbon scrubbers 520a, 520b, 520c.

Figure 3:
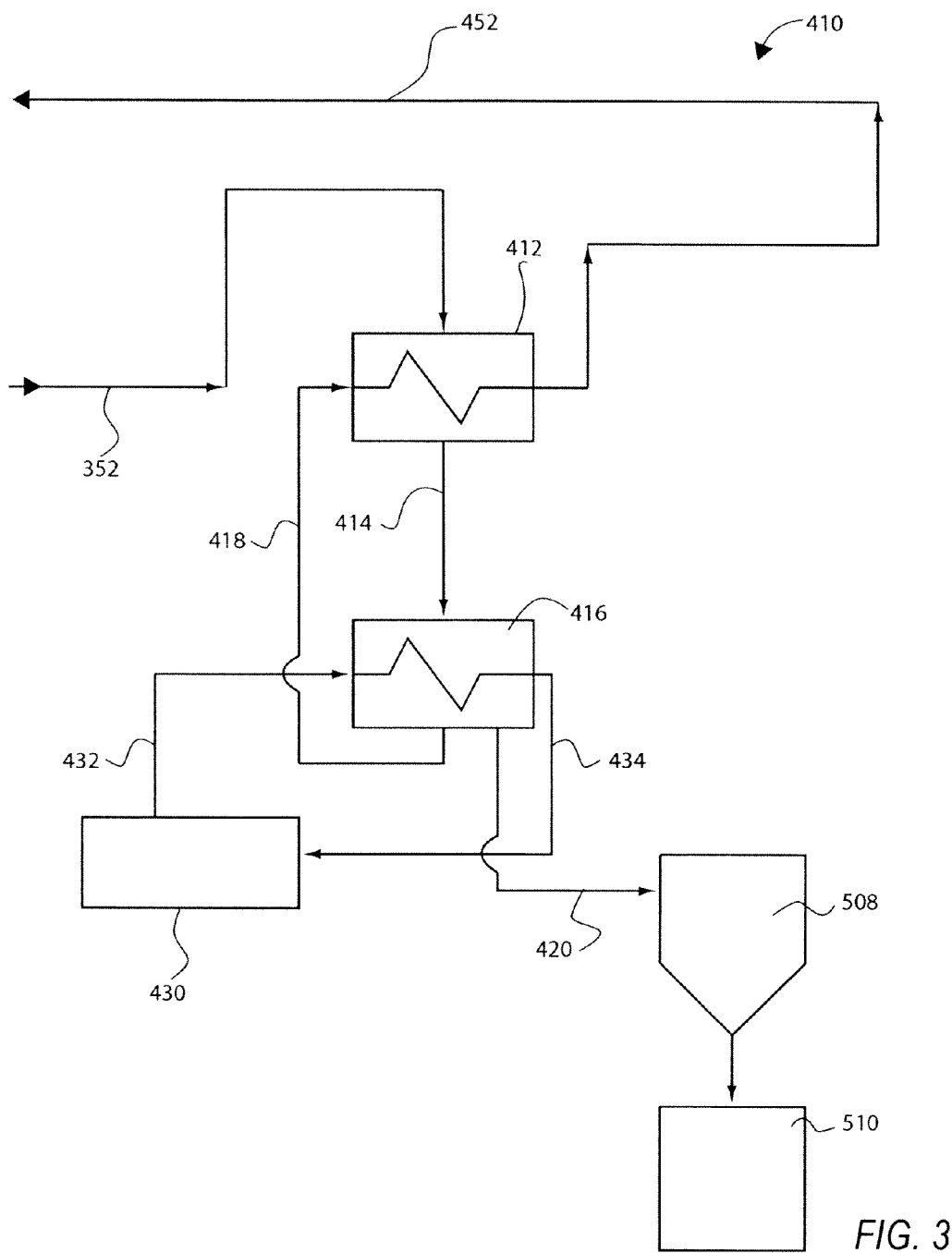
FIG. 3 is a block diagram of an embodiment of a compression/condensation system for condensing pollutant-laden vapor from a gas.

According to an embodiment shown in FIG. 3, further differentiation of other systems is schematically illustrated, whereby, for example condensation module 410 comprises a heat exchange system for reducing the temperature of the gas containing contaminated vapor. This module responds to ongoing challenges others have had in dealing with certain volatiles which are not easily converted into the liquid phase. The process causes many chemicals to condense into a liquid, which is subsequently routed to contaminant recovery module 500.

According to embodiments, condensation module 410 comprises a plurality of heat exchanging mechanisms 412, 416. Air/air heat exchanger 412 accomplishes initial cooling of compressed contaminated vapor. Importantly, air/air heat exchanger removes virtually all of the water and water vapor in the compressed gas. After initial cooling has occurred, the compressed contaminated vapor is transferred to air/refrigerant heat exchanger 416 via warm vapor conduit 414. Further cooling of the compressed contaminated vapor occurs in air/refrigerant heat exchanger 416, causing condensation of the compressed contaminated vapor as the temperature of the gas containing the contaminated vapor drops below condensation point depending on the chemical being condensed. At this stage the compressed vapor is virtually dry and free of water and water vapor, according to embodiments.

Air/air heat exchanger 412 and air/refrigerant heat exchanger 416 work in tandem to heat and cool their respective input and output gasses. The cold output from air/refrigerant heat exchanger 416 is routed through air/air heat exchanger 412 via cold vapor conduit 418. Warm gas incoming to air/air heat exchanger 412 from aftercooler 350 via vapor elimination inlet conduit 352 is therefore cooled by the cold gas routed into air/air heat exchanger 412 and the cold gas in cold vapor conduit 418 is likewise warmed by warm gas incoming from aftercooler 350 via vapor elimination inlet conduit 352.

According to embodiments, air/air heat exchanger 412 and air/refrigerant heat exchanger 416 are disposed in condensation module 410 in pairs. Typically, the pairs of heat exchangers 412, 416 work in cycles. During the cooling phase in air/refrigerant heat exchanger 416, condensate of the compression contaminated vapors forms. Condensate will continue to form as long as refrigerant remains in air/refrigerant heat exchanger 416. To remove the condensate, the air/refrigerant heat exchanger 416 must undergo a thawing cycle to liquefy the condensate and remove it, which requires the refrigerant to be removed. Thus, by using pairs, first air/refrigerant heat exchanger 416 cools while the second air/refrigerant heat exchanger 416 thaws. Once thawing is complete, the respective functions are reversed and the first air/refrigerant heat exchanger 416 thaws while the second air/refrigerant heat exchanger 416 cools. Thawed liquefied contaminant is removed from heat exchangers 412, 416 as would be known to artisans. The heat exchange process described herein is accomplished, according to embodiments, in cycles to optimize heat exchange and prevents air/refrigerant heat exchanger 416 from freezing up.

According to embodiments, refrigerant and warm gas to be cooled by refrigerant are input at the same location and experiences parallel flow rather than cross flow, as known in the art. Embodiments employing parallel flow are more rapidly cooled, allowing for shorter cycle times and improving the overall efficiency of the system. According to embodiments, cross flow configurations and parallel flow configurations may be chosen on a case by case basis as would be known to a person of ordinary skill in the art.

Air/refrigerant heat exchanger 416 exchanges heat as would be known to a person of ordinary skill in the art. That is, the refrigerant provides the cooling for the gas. The final temperature range of the gas depends on the coolant used, airflow, and other factors. According to embodiments, if a majority of contaminant condenses in air/air heat exchanger 412, then gas flow may be increased or cycle time may be decreased as a matter of efficiency. Similarly, where contaminated vapor fails to condense at an efficient rate, gas flow may be decreased or cycle time may be increased to expose gas to refrigerant for a longer period.

According to other embodiments where heat exchange occurs in cycles, gas flow rate remains constant, but the duration the gas is exposed to the heat exchangers is varied. Thus, if air/air heat exchanger 412 inefficiently condenses vapor, the duration in the air/refrigerant heat exchanger 416 may be increased in each cycle. Thus, variations in the optimization of gas temperatures may likewise be effected.

According to embodiments, aftercooler 350 monitors the temperature of the compressed contaminated gas to deliver it to condensation module 410 within an optimal temperature range for condensation cycling. Compressed contaminated gas that is too cold will not effectively warm cold exhaust from air/refrigerant heat exchanger 416 and compressed contaminate gas that is too warm will be inefficiently cooled in condensation module 410 requiring cycle times to be increased to remove a substantial portion of contaminated vapors. Thus, tuning aftercooler to provide an optimal compressed contaminated gas temperature prior to delivery to condensation module 410 increases efficiency of the system and serves as an optimization step.

For example, condensed vapor leaves compressor 330 at approximately 250° F. and approximately 180 PSI. Aftercooler 350 reduces the temperature from approximately 250° F. to approximately 85° F. As previously described, an initial condensate will be formed as the gas is initially cooled in aftercooler 350. The initial condensate is transferred to an initial contaminant recovery tank or, according to embodiments, primary contaminant recovery tank 510 in contaminant recovery module 500.

Gas is transferred from aftercooler 350 to air/air heat exchanger 412 via vapor elimination inlet conduit 352. Gas entering air/air heat exchanger is cooled from approximately 85° F. to approximately 20° F., as the heat exchange occurs between the gas from aftercooler 350 and the cold gas from air/refrigerant heat exchanger 416. Further condensate is formed as the gas further cools to approximately 20° F. It is transferred to primary contaminant recovery tank 510 in contaminant recovery module 500 via contaminant recovery module conduit 420, according to embodiments. Specific gravity separator 508 may be included to separate contaminants by specific gravity and store separated chemical contaminants in multiple contaminant recovery tanks 510.

The gas cooled to 20° F. then transfers to air/refrigerant heat exchanger 416 for further cooling to a cold gas from approximately 20° F. to approximately (−30)° F. due to the heat exchange between gas and refrigerant, as known to artisans. As depicted in FIG. 3, refrigeration unit 430 provides refrigerant via refrigerant inlet conduit 432 to air/refrigerant heat exchanger 416 for cooling of the cold gas. To prevent freezing up problems, gas/gas heat exchanger 412 may be cycled with gas/refrigerant heat exchanger 416, as would be known to artisans. Thus, prior to freezing up, warmer gas from gas/gas heat exchanger 412 is used to warm the cold gas in gas/refrigerant heat exchanger 416. After cooling, the refrigerant returns to refrigeration unit 430 via refrigerant outlet conduit 434, according to embodiments. At this point in the process, virtually all water vapor has been removed from the gas, but chemical vapors may remain due to varying dew points and vapor pressures.

According to an embodiment, the final temperature of the cold gas depends on the length of time the gas is cooled and the refrigerant. In air/refrigerant heat exchanger 416 final condensation occurs and the condensate is collected after thawing and transferred to contaminant recovery module 500 via contaminant recovery module conduit 420. The dry cold gas is then transferred to air/air heat exchanger to cool incoming warm gas from aftercooler 350 and warm the cold gas. According to embodiments, cold gas is then touted to regenerative adsorber 450 to remove residual chemical vapors via regenerative adsorber inlet conduit 452.

According to embodiments, multiple condensation modules 410 may be used in parallel or in series to improve efficiency of the condensation process. A person of ordinary skill in the art will understand that each remediation site may require optimization dependant on the particular contaminants at the site, their relative abundance, their vapor pressures, their dew points, and their specific heat of phase conversion.

However, the prior art systems have been unable to be industrially effective for condensation of more challenging contaminants. The present invention's optimizing differentiates it from extant systems, with condensation modules 410 used in parallel to provide for greater gas flow through the system. Conversely, condensation modules 410 may be used in series to expose contaminated vapor to subsequent condensation steps in an attempt to remove greater percentages of total contaminants during the condensation step, according to embodiments.

Figure 4:
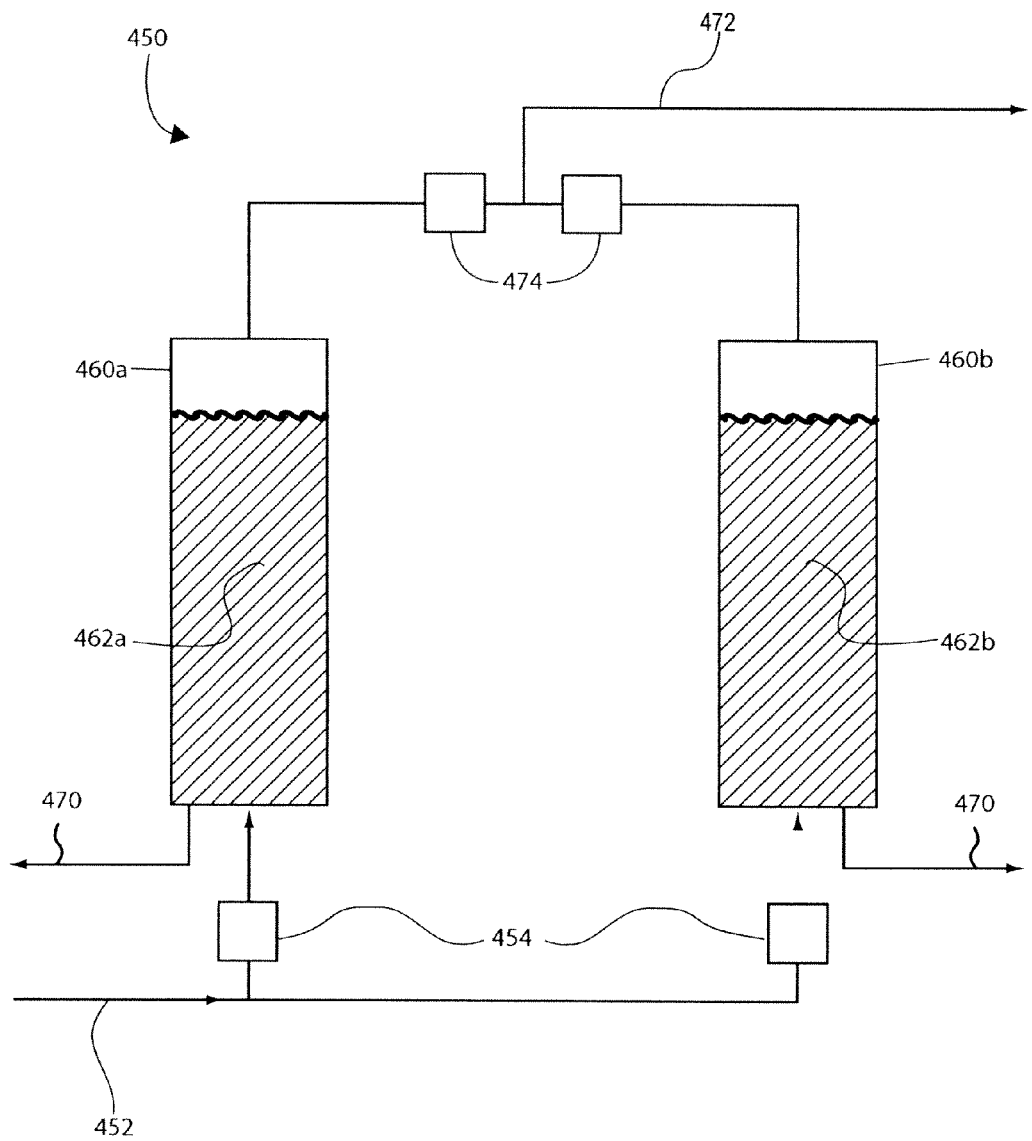
FIG. 4 is a block diagram of an embodiment of a regenerative adsorption system.

After the condensation step, residual contaminated vapor typically remains in the gas due to incomplete condensation or chemicals that are not cooled enough or for long enough for condensation to occur. According to an embodiment in FIG. 4, high-pressure gas containing residual contaminated vapor is routed to regenerative adsorber module 450 via regenerative adsorber inlet conduit 452. As shown, two adsorption chambers 460a, 460b work in tandem to adsorb residual contaminated vapor. During operation, one adsorption chamber 460a, 460b adsorbs residual contaminated vapor while the other adsorption chamber 460b, 460a deadsorbs contaminated vapor. The process of desorption regenerates adsorption material 462a, 462b for re-adsorption of contaminated vapor.

According to an embodiment, an adsorption material 462a, 462b is activated alumina. A person of ordinary skill in the art will readily know and appreciate that other, similar materials may be used in adsorption module depending on the nature of the remediation site, the chemicals involved, and goals of each remediation project. Adsorption by adsorption materials, such as activated alumina, carbon, or resins, occurs at high pressure; desorption occurs at low pressure. Other similar materials and materials specifically suited to adsorption of specific chemicals are expressly contemplated as would be known to a person of ordinary skill in the art. Both adsorption and desorption are temperature insensitive processes, which makes the present system superior for many types of remediation, such as with halogenated chemicals due to the lack of necessity to introduce heat and form strongly acidic byproducts as a result in the desorption process.

Contaminated vapor is introduced to regenerative adsorber module 450 via regenerative adsorber inlet conduit 452. Disposed between regenerative adsorber inlet conduit and each adsorption chamber 460a, 460b are inlet valves 454. Inlet valve 454 control which adsorption chamber 460a, 460b is adsorbing residual contaminated vapor and adsorption chamber 460a, 460b desorbing contaminated vapor. During the adsorption process, inlet valve 454 is in an open position allowing gas containing residual contaminated vapor to enter adsorption chamber 460a, 460b and contact adsorption material 462a, 462b. During the desorption process, inlet valve 454 is in a closed position to prevent gas from entering adsorption chamber 460a, 460b.

During the adsorption process, gas containing residual contaminated vapor is forced through adsorption material 462a, 462b in adsorption chamber 460a, 460b. Adsorption material 462a, 462b removes vapor from the gas, including contaminated vapor. As vapor is removed from the gas, adsorption material 462a, 462b charges with contaminated vapor. Gas leaving adsorption chamber 460a, 460b is therefore substantially clean. Artisans will recognize that one of flow rate of the gas containing contaminated vapor or cycle time will vary from remediation site to remediation site.

Depending on the types of chemicals being removed, the concentration of the contaminants, the relative amount of contaminated vapor removed in previous remediation steps, for example compression/condensation, and the efficiency of adsorption material 462a, 462b in removing particular vapors from the gas, the parameters within which the system runs will differ. To that end, a person of ordinary skill in the art will know and understand that flow rate or cycle time, adsorption material 462a, 462b, surface area of adsorption material 462a, 462b, and other similar variables known to artisans will be evaluated and optimized on a per site basis. In some cases, multiple regenerative adsorption modules 450 will be used in series to accomplish a desired reduction in contaminated vapor passing through vapor elimination module 400.

According to an embodiment where adsorption material 462a, 462b is activated alumina or other materials, adsorption of vapor in gas occurs at high pressure. For example and according to an embodiment, cold gas leaving condensation module 410 is at approximately 150 PSI (referring back to FIG. 1) having been compressed prior to entering condensation module 410. After leaving condensation module 410 and entering regenerative adsorber module 450, gas pressure is still at approximately 150 PSI.

Referring again to FIG. 4, once gas has been exposed to and caused adsorption material 462a, 462b to be charged with contaminated vapor, the exhaust is substantially clean. It escapes through clean exhaust conduit 472. Disposed on clean exhaust conduit 472 are clean exhaust valves 474, according to the exemplary embodiment. Generally, at least one clean exhaust valve 474 is disposed along clean exhaust conduit 472 per adsorption chamber 460a, 460b, although multiple clean exhaust valves 474 are contemplated as would be known to artisans. Clean exhaust conduit 472 releases substantially clean gas into the ambient air or routes the substantially clean gas to scrubbers 530, according to embodiments. A back pressure regulator may be disposed prior along clean exhaust conduit 472 to maintain a baseline of pressure in remediation and chemical recovery system 100.

According to embodiments, clean exhaust valves 474 shunts a portion of substantially clean gas for the purpose of desorption. When clean exhaust valve 474 is "closed," it allows a small flow of clean exhaust gas to flow to charged adsorption chamber 460a, 460b and through charged adsorption material 462a, 462b. This low pressure flow causes adsorption material 462a, 462b to release the contaminated vapors collected in the charging step. These vapors exit through exhaust conduit 470 as inlet valve 454 is closed for charged adsorption chamber 460a, 460b as the desorption step occurs.

To that end, clean exhaust valves 474 are configured to shunt a portion of the substantially clean gas into adsorption chamber 460a, 460b that is desorbing contaminated vapor. Because desorption occurs at lower pressure, a small percentage of the total clean exhaust gas is diverted as a low pressure gas to desorbing adsorption chamber 460a, 460b, while the remaining substantially clean gas continues through clean exhaust conduit 472. The process of shunting a small percentage of substantially clean gas may be accomplished by partially opening clean exhaust valve 474 or through the use of a multiple valve system, as would be known to artisans. For example, clean exhaust valve 474 may comprise one valve that allows low-pressure substantially clean gas to pass during adsorption chamber's 460a, 460b desorption cycle and a separate valve that may be fully opened to allow high-pressure substantially clean gas to escape during the adsorption cycle. The implementation of such a system will be known and understood by a person of ordinary skill in the art.

Consequently, as one adsorption chamber, e.g., 460a, of regenerative adsorber module 450 is being charged with contaminated vapors and exhausting substantially clean exhaust gas, adsorption chamber, 460b is being desorbed of contaminated vapors previously collected and contained in adsorption material 462b. Desorption occurs as a percentage of the substantially clean gas forming a low pressure flow is shunted into adsorption chamber 460b. After adsorption chamber 460a becomes fully charged, the system is reversed and adsorption chamber 460b is charged with contaminated vapors while adsorption chamber 460a is desorbed of the previously collected contaminated vapors.

During the desorption cycle of adsorption chamber 460a, 460b, adsorption material 462a, 462b starts in a state wherein adsorption material 462a, 462b is fully charged with contaminated vapor. As low-pressure substantially clean air is shunted into adsorption chamber 460a, 460b, vapor contained in adsorption material 462a, 462b is released from adsorption material 462a, 462b into the low-pressure substantially clean gas. The resultant gas comprises concentrated contaminated vapor. The gas containing the concentrated contaminated vapor is then routed through exhaust conduit 470 to vacuum and compression module 300 for recompression and rerouting through compression/condensation.

Multiple regenerative adsorber modules 450 may be placed in series or in parallel as a matter of efficiency to ensure adequate removal of particularly difficult contaminants. Moreover, efficiencies of the present system may provide for increased gas flow rates, and thus more rapid remediation of a polluted remediation site, due to increased efficiency of remediation and chemical recovery system 100 over conventional SVE systems.

Thus, artisans will appreciate that nearly all contaminated vapor from the ground is eliminated by compression/condensation. Vapor that escapes compression/condensation is captured by adsorption material 462a, 462b for reconcentration during the desorption process. The reconcentrated contaminated media will then be more readily condensed out during a second round of compression/condensation owing to the increased concentration of the contaminated vapor, where it would have originally escaped due to the fact that the concentration of contaminated vapor dropped below a critical point where no additional contaminated vapor of a given chemical could be condensed out of the gas. The compression/condensation-adsorption cycle is repeated until the measured volumetric concentration output of contaminant being removed shows the remediation site is substantially clean.

Referring now also to FIG. 1, scrubbers 520a, 520b, 520c may be introduced into SVE system 200 to remove contaminated vapor that escapes regenerative adsorption module 450. Scrubbers 520a, 520b, 520c may be conventional GAC traps. As shown in FIG. 1, scrubbers 520a, 520b, 520c may occur in series to achieve a desired gas concentration of contaminant. Scrubbers 520a, 520b, 520c are connected to vapor elimination module 400 via clean exhaust conduit 472. The specific acceptable final concentration of each contaminant will be known to a person of ordinary skill in the art and defined by applicable environmental statute. According to embodiments wherein GAC is used as the scrubbing media, scrubbers 520a, 520b, 520c will periodically need to have GAC replaced once it becomes fully charged with contaminant. After gas is scrubbed to the desired contaminant concentration, gas is discharged to the ambient air via discharge conduit 530.

Figure 5:
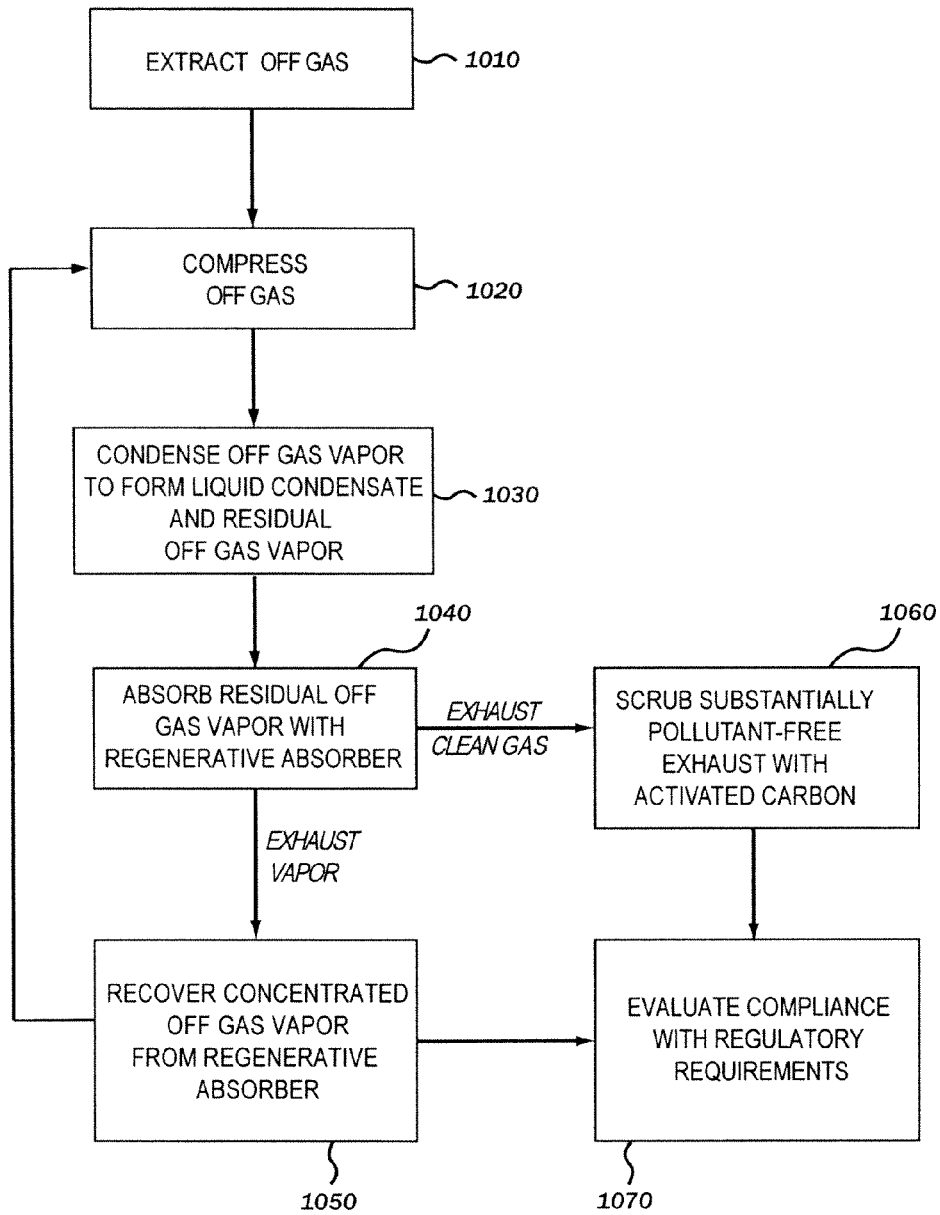
FIG. 5 is a flow chart of an embodiment of a method for removing pollutant-laden vapor from gas extracted from soil.

According to an embodiment of a method for vapor extraction shown in FIG. 5, vapor is extracted from the soil of a remediation site 1010. These vapors, as previously discussed contain vapors contaminated with pollutant. After extraction, the off gas is compressed 1020 as previously described. Thereafter, the compressed gas is cooled in a condensation process 1030, which causes much of the contaminated vapors to condense into a liquid form that may be captured.

Residual contaminated vapors not captured by the compression and condensation process are routed to a regenerative adsorber 1040. Once gas is treated in regenerative adsorber step, it is substantially clean. It is exposed to scrubbing with activated carbon 1060 to ensure the final exhaust is virtually clean. Prior to scrubbing, a portion of the substantially clean gas is routed through the regenerative adsorber at low pressure. The regenerative adsorber collects and then releases contaminated vapor as a concentrated vapor 1050 which is routed to the compression step 1020.

Likewise disclosed is a method for optimizing the use of the systems of the present disclosures. The optimization method ensures efficient flow. Initially, plans are generated to do this based on ostensive containments to be addressed. These plans may be directed towards general remediation of a site, to specific contaminants, or according to the directive of a regulatory authority, such as the United States Environmental Protection Agency. Generally, the plan will include use of a remediation system, such as the SVE system disclosed herein. Depending on the particular contaminants to be addressed, optimizations of the remediation will address the particular parameters of the remediation system.

For example, a remediation site may be contaminated with difficult to remove contaminants such as chloromethane or freon that will be removed by compression and condensation inefficiently. In these types of cases, for example, airflow, cycle time, or both may be reduced to optimize performance of the remediation system. In other embodiments, airflow may be increased when compression and condensation is efficient. Additionally, the freeze and thaw cycles of the compression and condensation modules may be varied and optimized based on the plan. Similarly, decisions may be made to use systems with multiple compression and condensation modules and regenerative adsorber modules in series or in parallel, depending on embodiments. Similarly, the adsorption and desorption may be cycled to adjust the system to site conditions, as necessary and according to embodiments.

Figure 6:
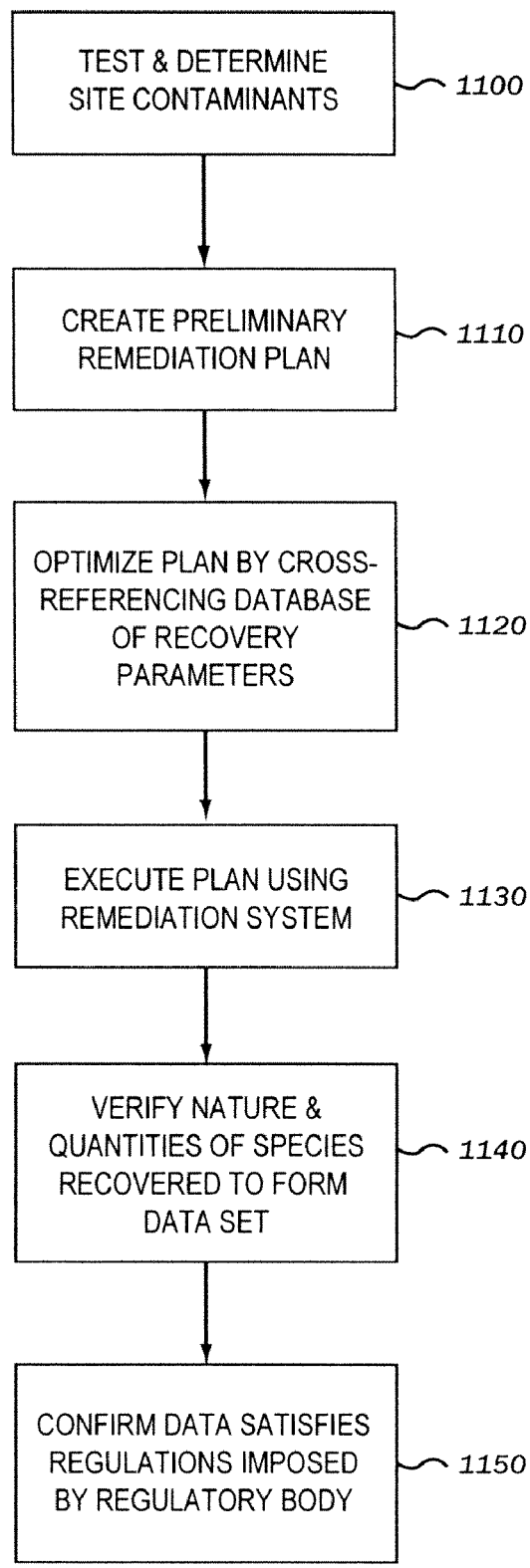
FIG. 6 is a flow chart of an embodiment of a process for addressing contaminants at a contaminated site.

According to an embodiment of a method for addressing soil remediation as shown in FIG. 6, the site is first tested and the contaminants for a particular site identified 1100. After determination of the types, concentrations, and relevant data regarding the contaminants, a remediation plan is developed 1110. The remediation plan details flow rates, locations for extraction of contaminated vapor, and other similar considerations that would be useful in formation of the remediation plan. Artisans will understand the relevant considerations in the formation of the remediation plan.

Prior to, during or after formation of the remediation plan, the plan may be optimized 1120, according, to embodiments. The optimization process generally comprises the cross-referencing of the contaminants to be removed with a database of parameters for removal of known contaminants. The database may be computerized or be another collection of data regarding the parameters in which contaminants may be extracted using a particular remediation technology. As contaminants will have varying extraction and chemical properties, a specific set of operating parameters for a remediation system may efficiently address a subset of contaminants while inefficiently addressing others. Optimization of the remediation plan will address the varying properties of the contaminants to create an efficient removal process that addresses all of the contaminants present without the undue waste in energy expenditure and resources associated with brute force and less efficient techniques.

After formation of an optimized remediation plan, the plan is executed 1130. After and during execution of the plan, the nature and quantities of the contaminants removed may be evaluated 1140, resulting in a set of data. This set of data then may be used to satisfy regulatory requirements imposed by a regulatory body 1150, according to embodiments. Moreover these data may be used to evaluate the remediation plan and the progress in overall remediation of the site.

Once the contaminants are known, the preliminary plan may be optimized using a database of recovery parameters as provided by an entity commissioning the site remediation or a regulatory authority. As these parameters tend to vary by the remediation site or over time (e.g., state and Federal environment regulations), optimization remains current, and the execution of the plan occurs such that the applicable parameters are met or exceeded.

Execution occurs as would be known and understood by a person of ordinary skill in the art. For example, if the SVE system of the present disclosure is used, the process occurs as described herein according to the plan and in accordance with the optimization rules.

After or during execution of the plan, the exact nature and quantities of the species recovered and remaining may be measured as a metric for determination of the successful execution of the plan. Moreover, the quality of the exhaust released from the remediation system into the environment may be monitored and measured. These data may then be examined for compliance with the regulations imposed by the regulatory authority. Examples of regulatory authority may be environmental groups, government entities such as legislatures and enforcement agencies (e.g., EPA), and other groups maintaining standards for environmental remediation.

According to embodiments, recovered contaminants may be separated and reused. Recycling of pure or substantially pure contaminants reduces the need to produce the contaminants for use in other useful applications, which further reduces environmental impact by reducing waste associated with the production of the contaminants. Contaminants may be separated and reused as part of a remediation process, such as by installing a specific gravity separator as previously described, or in an after remediation process as would be known and understood by artisans.

Example 1

A site was selected for remediation in southern California, wherein the system optimization was conducted to maximize the efficiency of the soil vapor extraction (SVE) system and expedite site cleanup. The SVE system primarily targeted volatile organic compound (VOC)-impacted soils beneath a former refrigerant plant and the immediate surrounding areas. The results that follow detail the monitoring of well cycling and a description of treatment system performance over a 6-month period.

Pilot testing of the remedial system was initiated 3 years earlier. Full-scale operation began a year prior to the monitoring reported in Example 1. Routine system monitoring was conducted to maximize contaminant removal while complying with South Coast Air Quality Management District (SCAQMD) regulations and permits.

The site was constructed in 1919 to produce sulfuric acid and process spent sulfuric acid generated at an oil refinery, located west of the site. Since that time, chemical manufacturing operations included the following activities: sulfuric acid production from 1920 to 1972, phthalic anhydride manufacturing from 1963 to 1982 (the phthalic anhydride plant was demolished in 1996); and production of refrigerants from 1964 to 2003.

Refrigerants were initially produced in 1964, including chlorofluorocarbons (CFCs) and hydrochlorofluorocarbons (HCFCs) such as trichlorofluoromethane (R-11), dichlorodifluoromethane (R-12), chlorodifluoromethane (R-22), and 1,1-dichloro-1-fluoroethane (R-141b). Raw materials for CFC/HCFC production included hydrofluoric acid, carbon tetrachloride, chloroform, 1,1,1-trichloroethane (1,1,1-TCA), and antimony pentachloride catalyst.

Several blends of the refrigerant 1,1,2-trichlorotrifluorethane (R-113) with organics (used primarily in the electronics industry) were packaged at the site from the early 1980s through January 2003. Additional organic compounds including methyl alcohol, ethyl alcohol, cyclopentane, hexane, methylene chloride, isopropanol, and acetone were used in the different blends. Refrigerant blending and production ceased on Jan. 31, 2003. The site user implemented corrective action in the vicinity of the refrigerant plant to remove VOCs in the zone of greatest impact and to minimize future impacts to groundwater.

Various interruptions to the SVE system operation during the monitoring period occurred for demolition activities over the 6-month monitoring period. The system was shut down at one point to meet the ongoing construction health and safety requirements.

Previous investigations documented the presence of VOCs in soil, soil gas, and groundwater beneath the site. The highest concentrations of VOCs, including CFCs and HCFCs, were located beneath the refrigerant plant.

SVE was selected as the preferred remedial measure after evaluating several different methods and technologies. SVE is a treatment process that is proven effective in remediating coarse-grained soils impacted with VOCs. Physical site constraints, such as the depth of impacted soils and site operations, were also considered in the selection of an appropriate technology.

The SVE system included a network of 12 vapor extraction wells (VEW) screened in multiple depth intervals. The system presented in the present disclosure was used to extract VOCs from the remediation site.

During initial pilot testing of the system, vapors were extracted from only one well and the condensed fluids were collected in half-ton pressure cylinders. A Department of Transportation (DOT) 2.2 classification, 50,000-pound capacity iso-tanker was delivered to the site and connected to the treatment system. This tank provided additional capacity to allow full-scale SVE operation. The SVE system was expanded to extract from multiple wells and from wells with higher contaminant concentrations.

The SVE system operated under a SCAQMD permit. This site-specific permit was issued with the following conditions addressing air emissions at the outlet of the scrubbers:

VOC concentrations shall not exceed 3 parts per million by volume (ppmv).

Carbon tetrachloride shall not exceed 1.8 ppmv.

Chloroform shall not exceed 0.9 ppmv.

Whenever the VOC concentration reaches 3 ppmv (as hexane), the carbon in the scrubbers shall be replaced with fresh adsorbent.

To ensure compliance with the SCAQMD permit, the system effluent was monitored by organic vapor sensors that were connected to the main system controls. The sensors automatically shut the system down if the effluent concentration exceeded the SCAQMD permit limit.

The initial phase SVE system installation included the installation of the condensation process equipment and piping to an existing well. Based on the radius of influence (ROI) data, it was determined that 12 wells were sufficient to accomplish the remediation goals.

During the monitoring period, the inventor periodically visited the site to conduct system maintenance operations, including adding oil to compressors, emptying drums, changing cylinders, and replacing filters, tubing, gaskets, carbon, and valves.

The delivery of a 50,000-pound capacity iso-tanker to the site immediately prior to the monitoring period provided greater operational flexibility and expanded product storage capacity. The full-scale operation strategy involves the cycling of 12 extraction wells to maximize the system influent concentrations.

Figure 7:
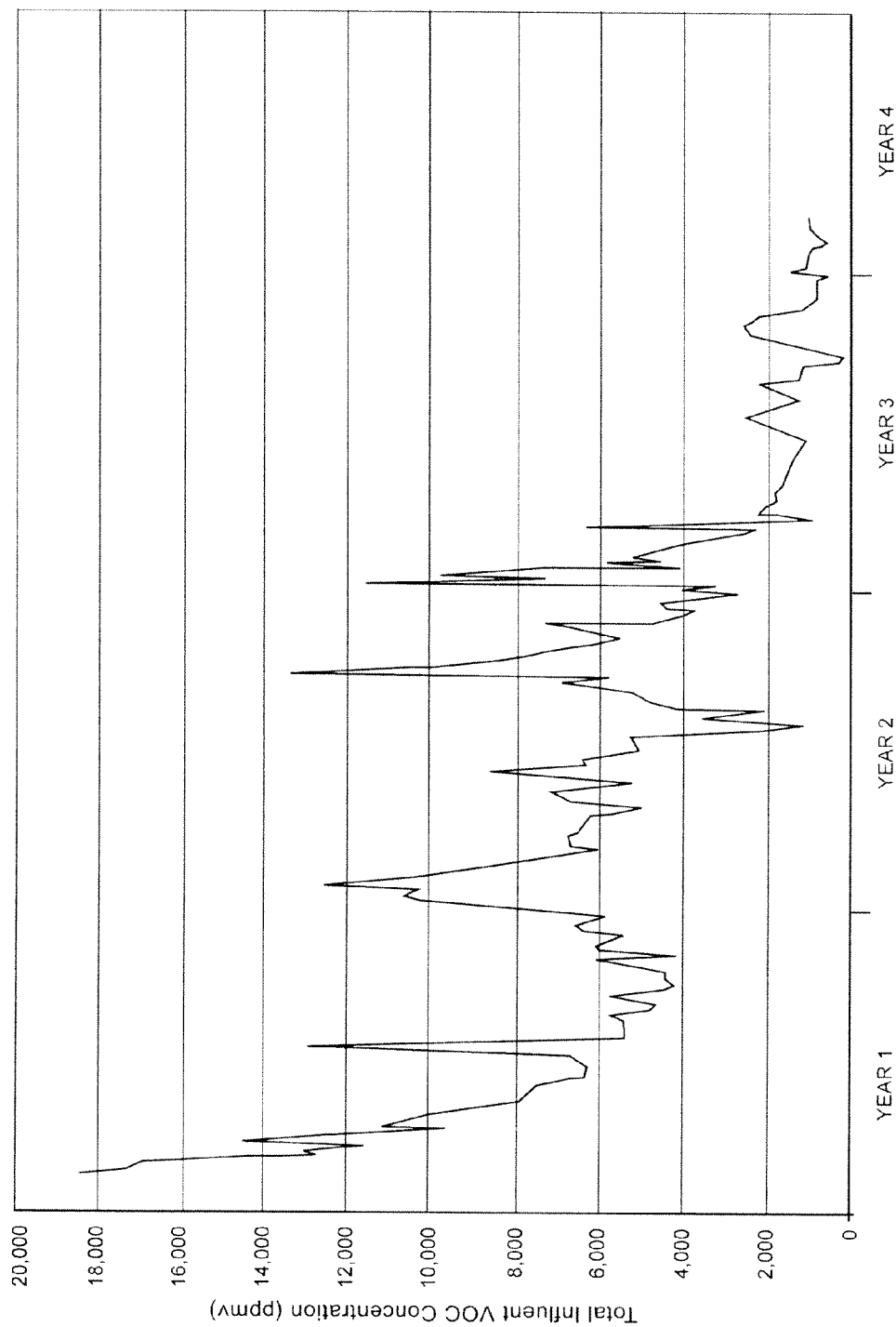
FIG. 7 is a graph of an embodiment of experimental data of the system of the present disclosure.

The objective was to reduce extraction well concentration to less than 2000 ppmv. The outer wells were cycled periodically since demolition activities prevented use of other wells. FIG. 7 illustrates the system influent VOC concentrations for the remediation site. As indicated, the peaks are indicative of new wells being opened and added to the SEV system. As of the end of the reporting period, all system wells appeared to be near or below 2000 ppmv.

Figure 8:
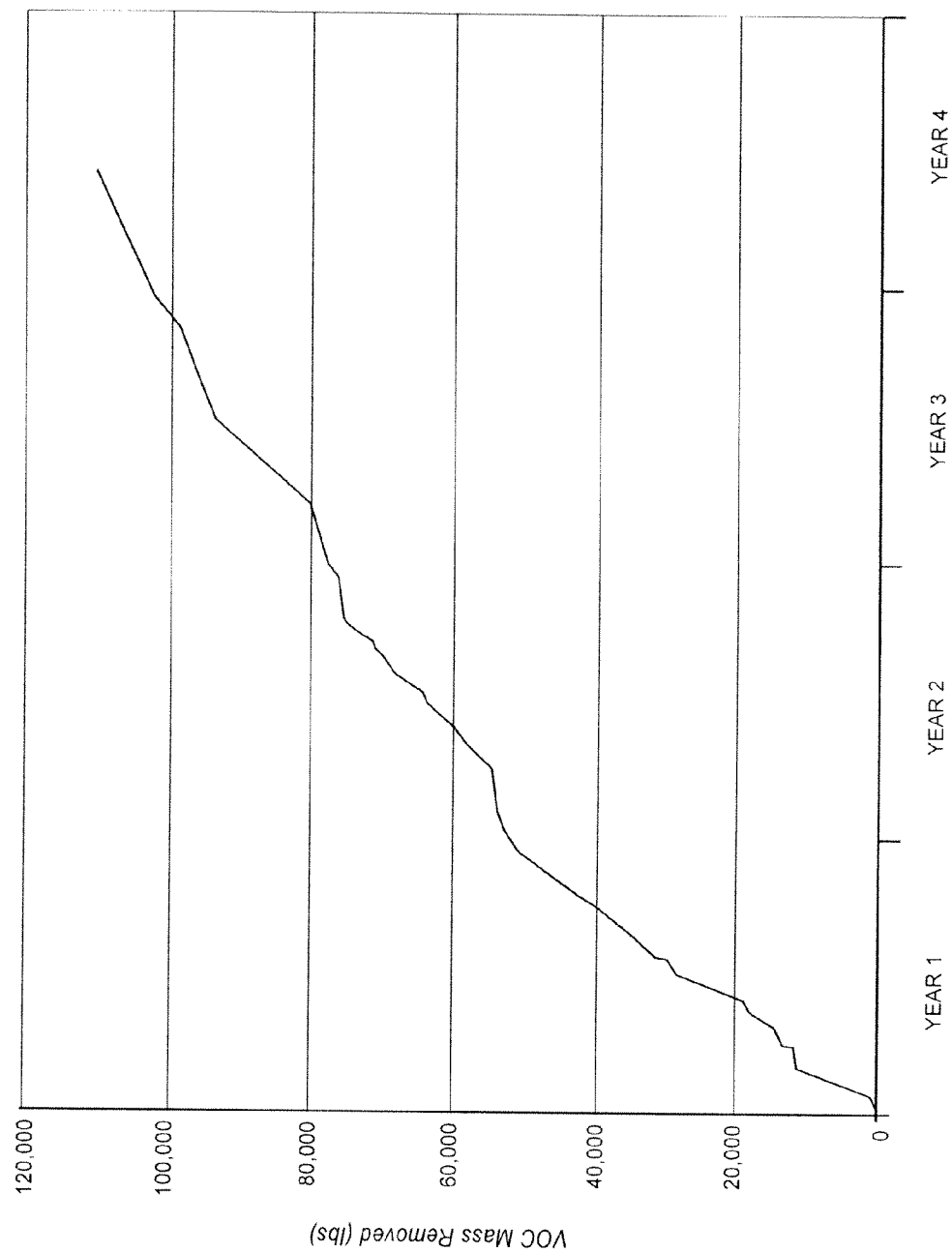
FIG. 8 is a graph of an embodiment of experimental data of the system of the present disclosure.

VOC mass removal during the monitoring period is shown in FIG. 8. Measurements of product removed since the system operations began are listed in Table 5. The mass total does not include dissolved VOCs removed in the condensed aqueous waste stream or vapor-phase VOCs adsorbed to carbon, which are considered negligible in comparison to the pure-phase product removed. The total mass recovered was calculated by weighing the iso-tank before and after each replacement. The combined mass of solvents recovered during the monitoring period was 7,960 pounds. Over the course of the whole experiment, 110,202 pounds of VOCs were removed, as shown in FIG. 8.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A system for extracting pollutants from an off gas comprising, in combination:
   at least one off gas extraction source;
   a compressor;
   a condensation module to condense fluid from the off gas, comprising an air-to-air heat exchanger and an air-to-refrigerant heat exchanger;
   a regenerative adsorbing unit, the regenerative adsorbing unit having at least one regenerative adsorber; and
   a specific gravity separator;
   wherein an exhaust gas from the air-to-refrigerant heat exchanger is used to cool an intake gas into the air-to-air heat exchanger and the intake gas into the air-to-air heat exchanger is used to warm the exhaust gas from the air-to-refrigerant heat exchanger.

* * * * *